Sept. 6, 1927.

H. A. THOMPSON 1,641,789

RAILWAY TRAFFIC CONTROLLING APPARATUS

Filed Aug. 6, 1924     10 Sheets-Sheet 1

Fig.1.

INVENTOR:
H. A. Thompson
by A. L. Vincill
His Attorney.

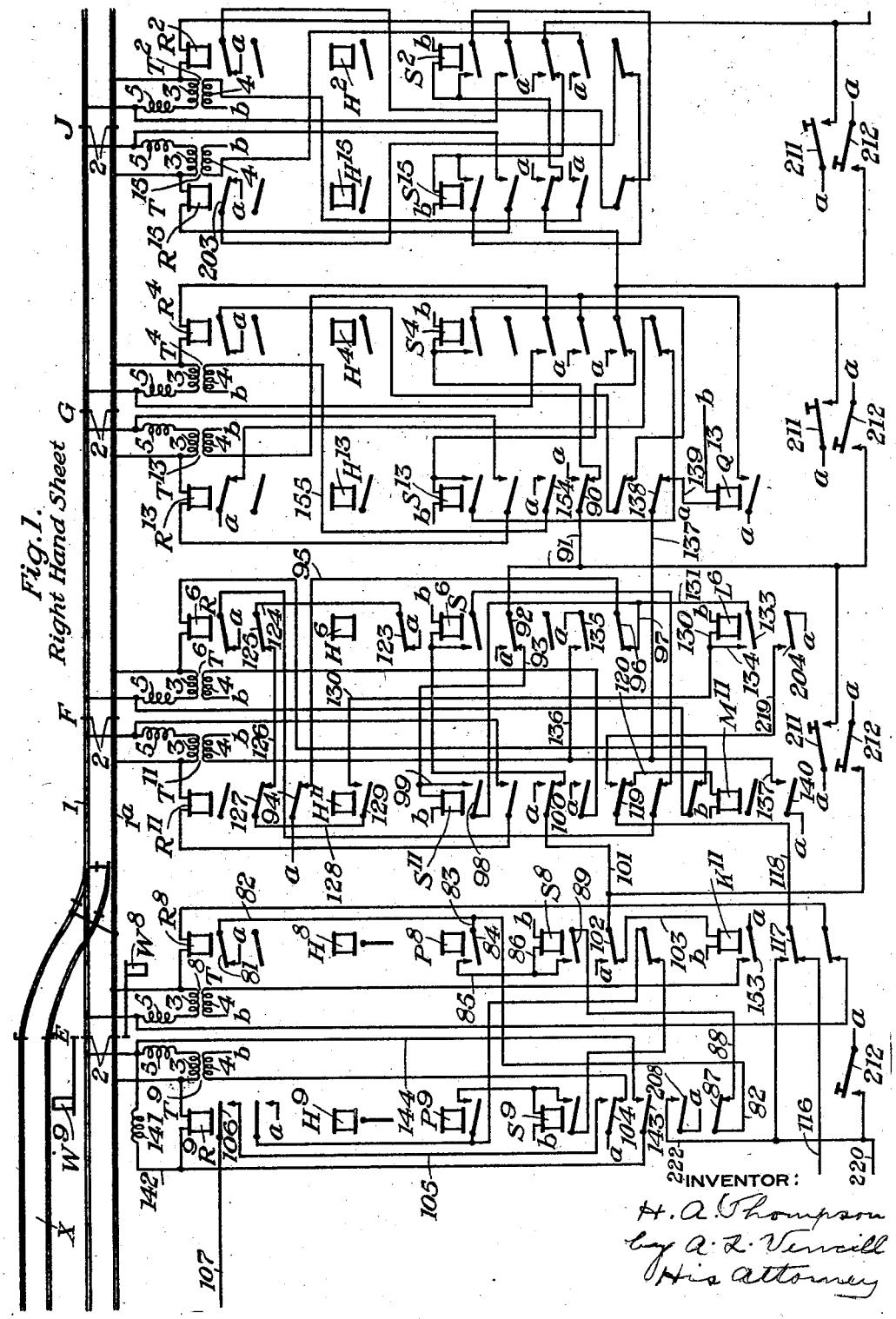

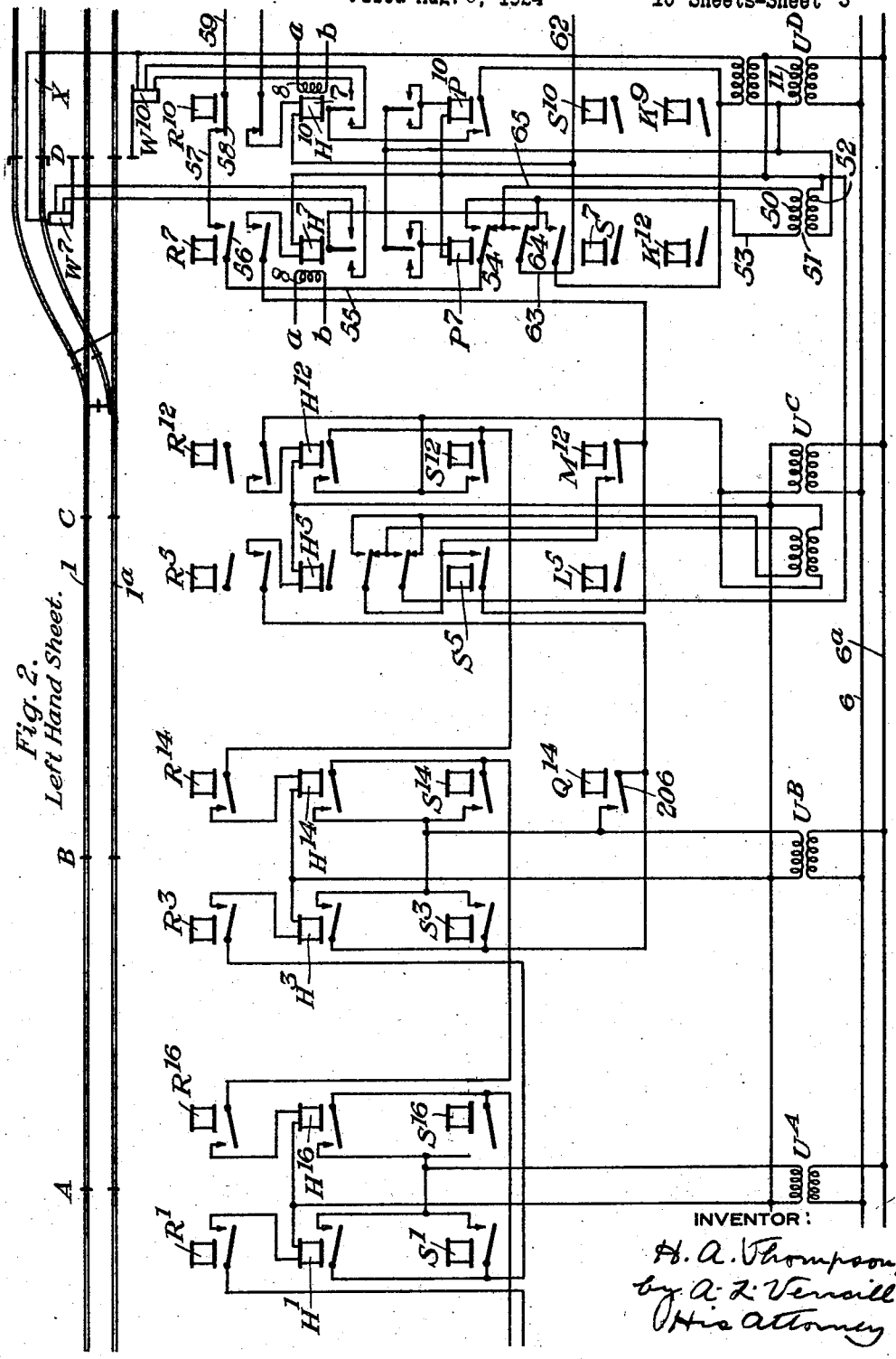

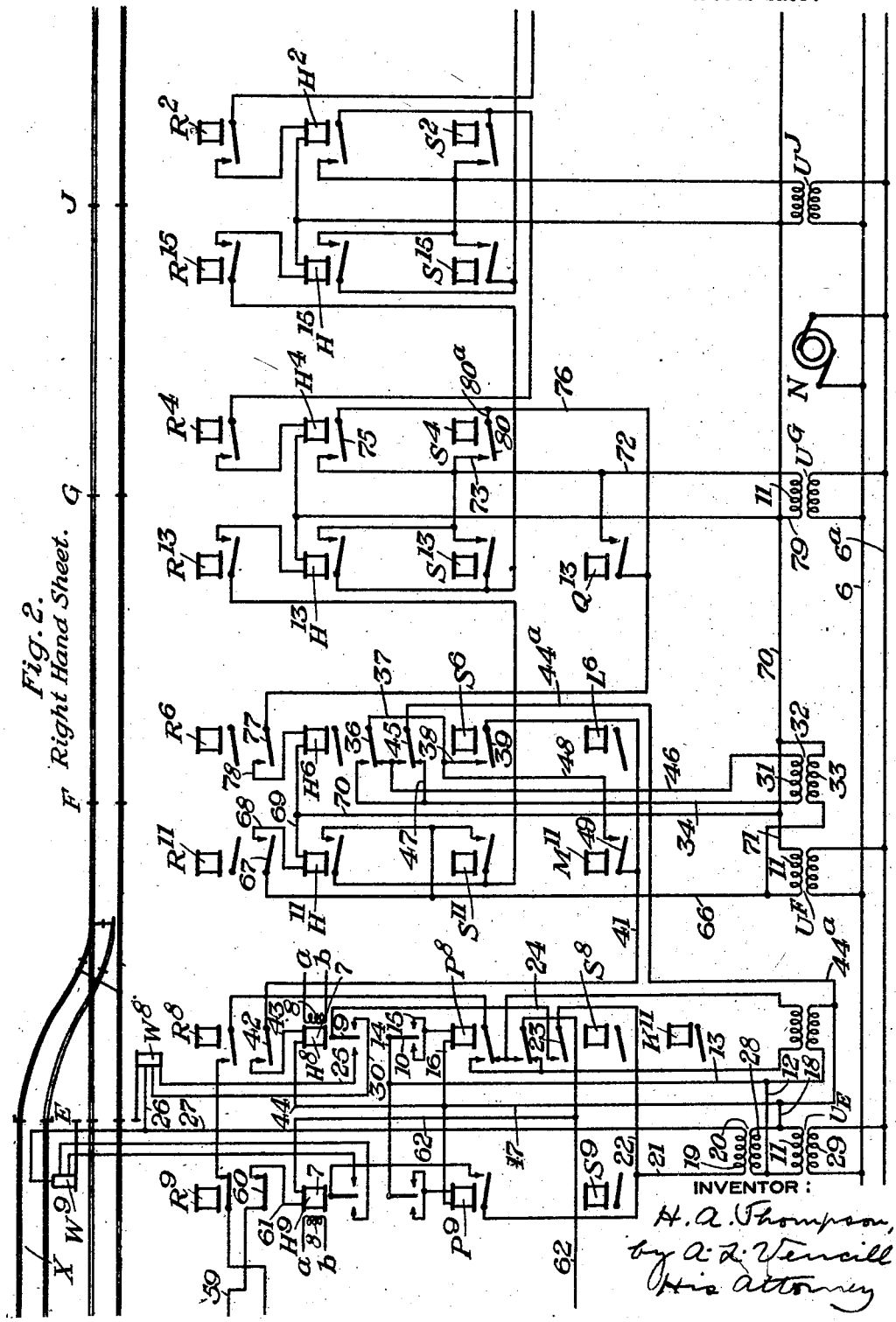

Sept. 6, 1927.                                                           1,641,789
                        H. A. THOMPSON
                RAILWAY TRAFFIC CONTROLLING APPARATUS
                    Filed Aug. 6, 1924        10 Sheets-Sheet 5

Fig. 3.
Left Hand Sheet.

INVENTOR:
H. A. Thompson,
by A. L. Vencill
His Attorney

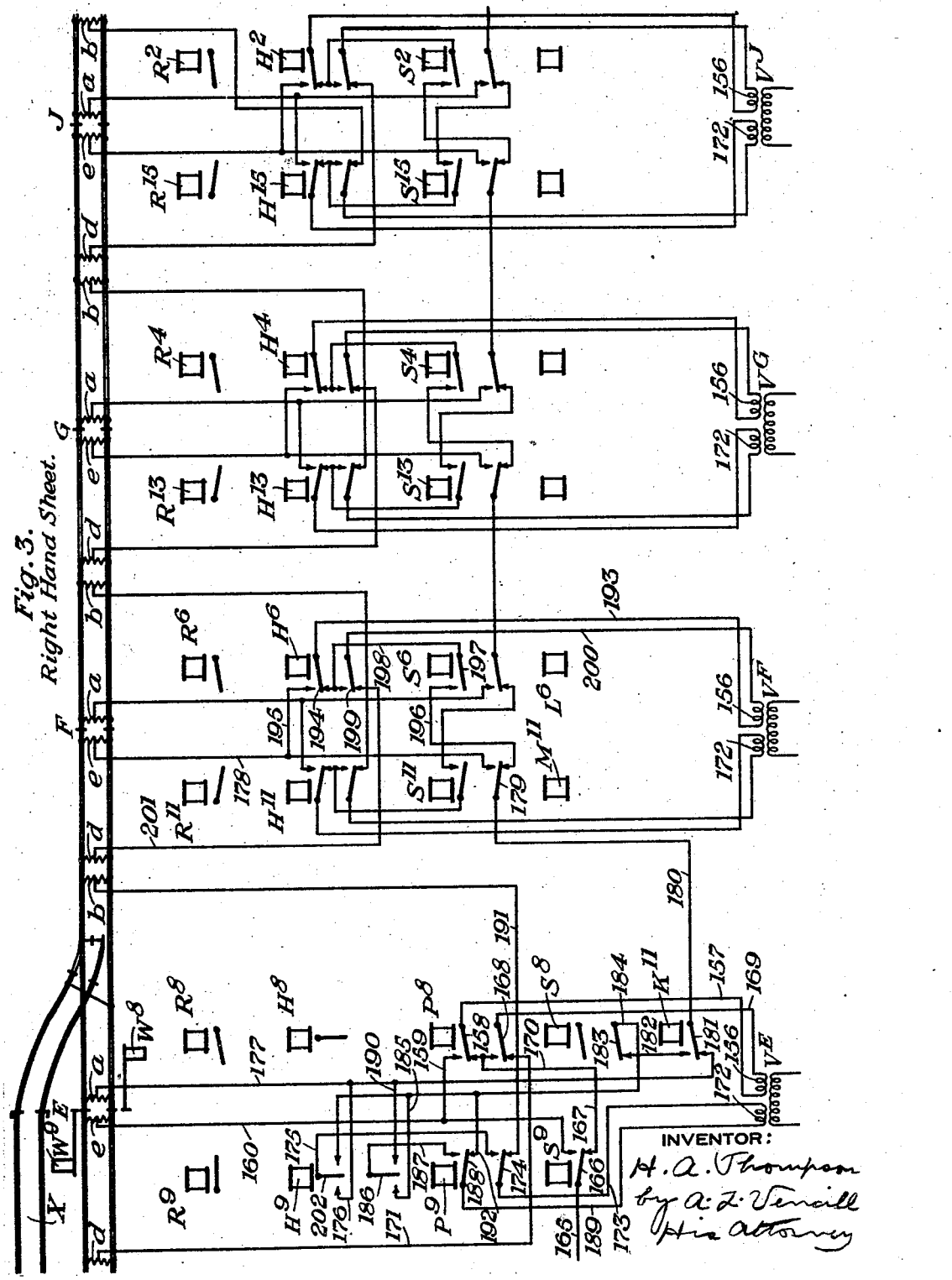

Sept. 6, 1927.  1,641,789
H. A. THOMPSON
RAILWAY TRAFFIC CONTROLLING APPARATUS
Filed Aug. 6, 1924   10 Sheets-Sheet 7

Fig. 4.
Left Hand Sheet.

INVENTOR:
H. A. Thompson
BY O. L. Verrall
His ATTORNEY

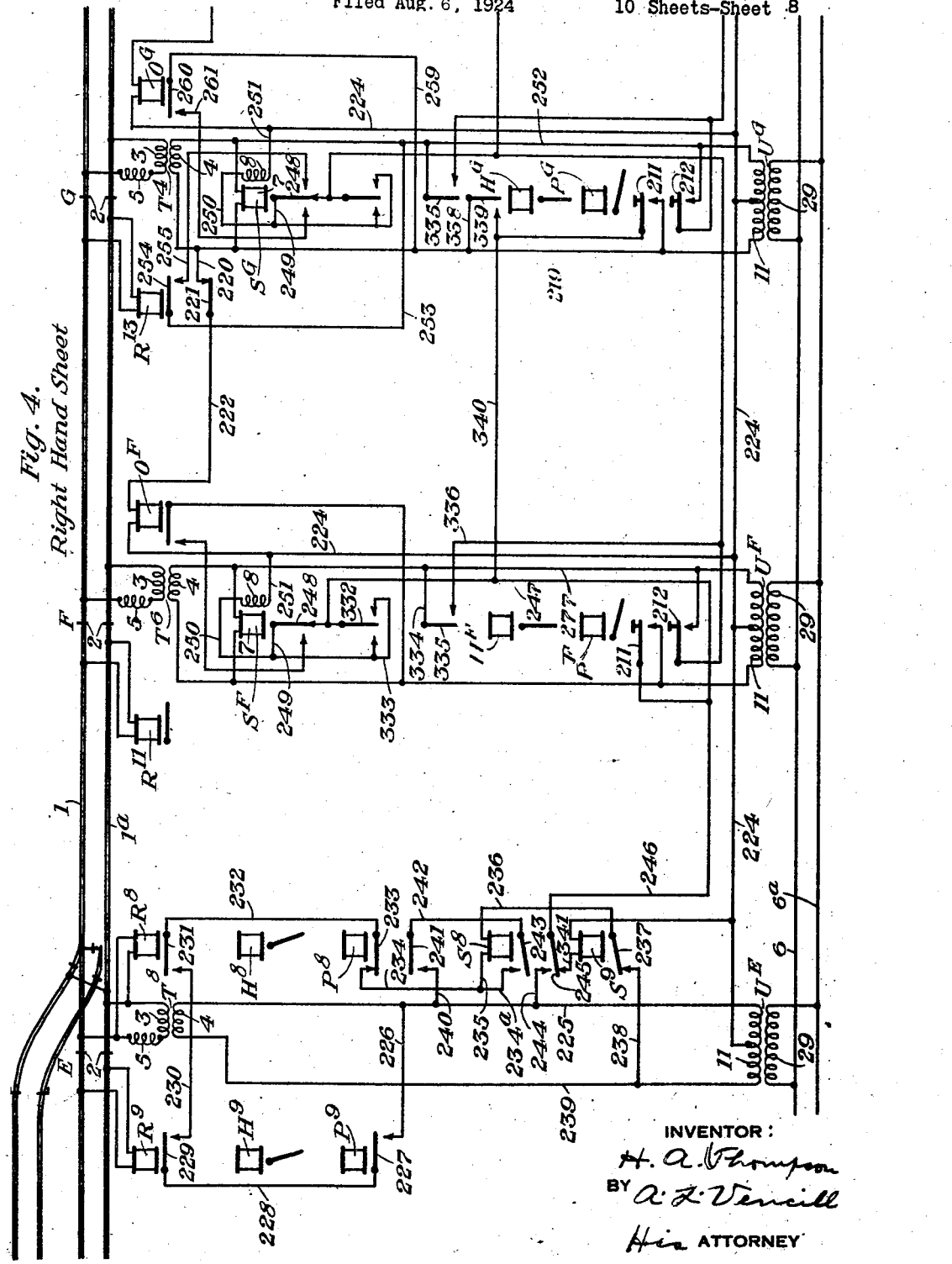

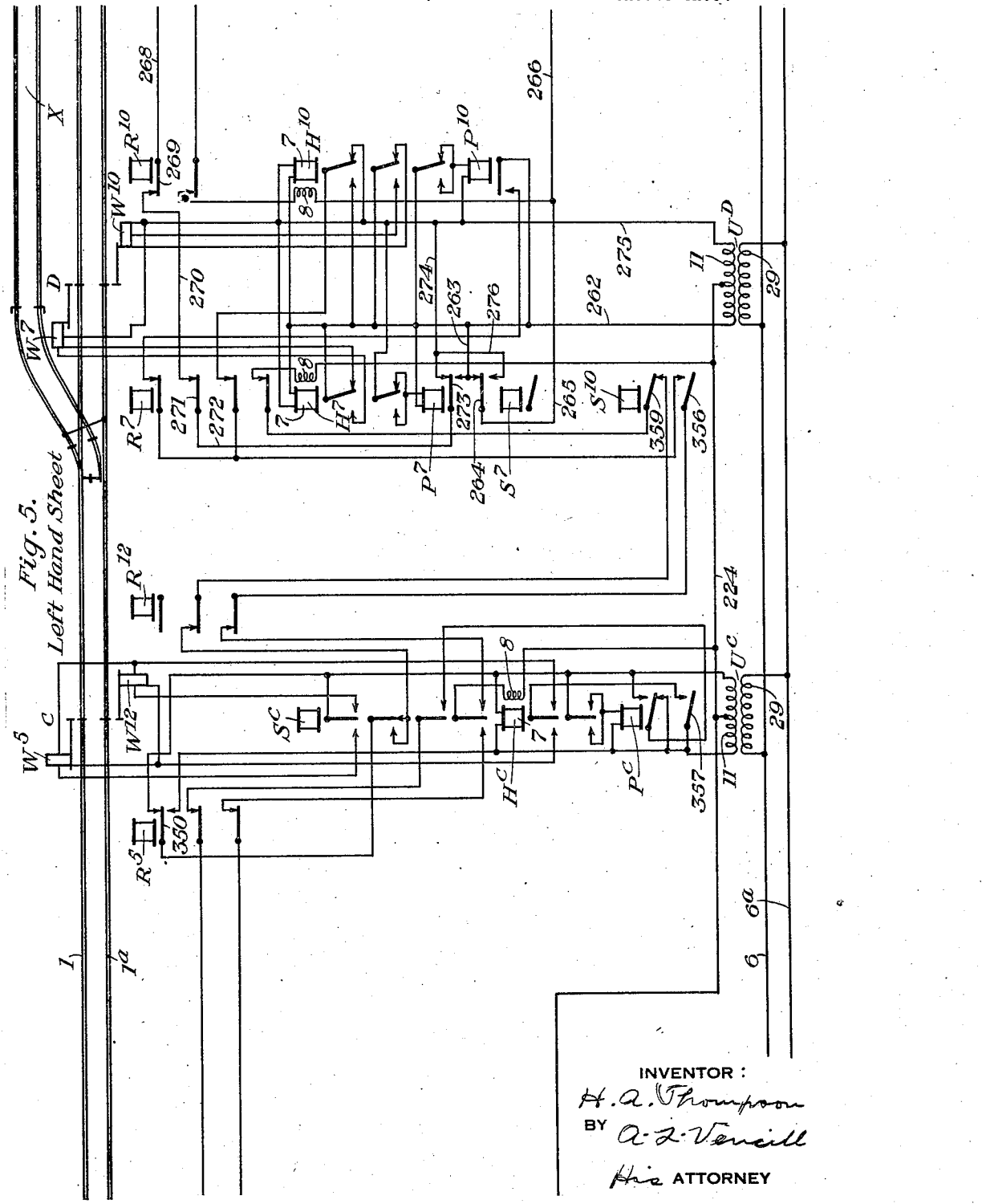

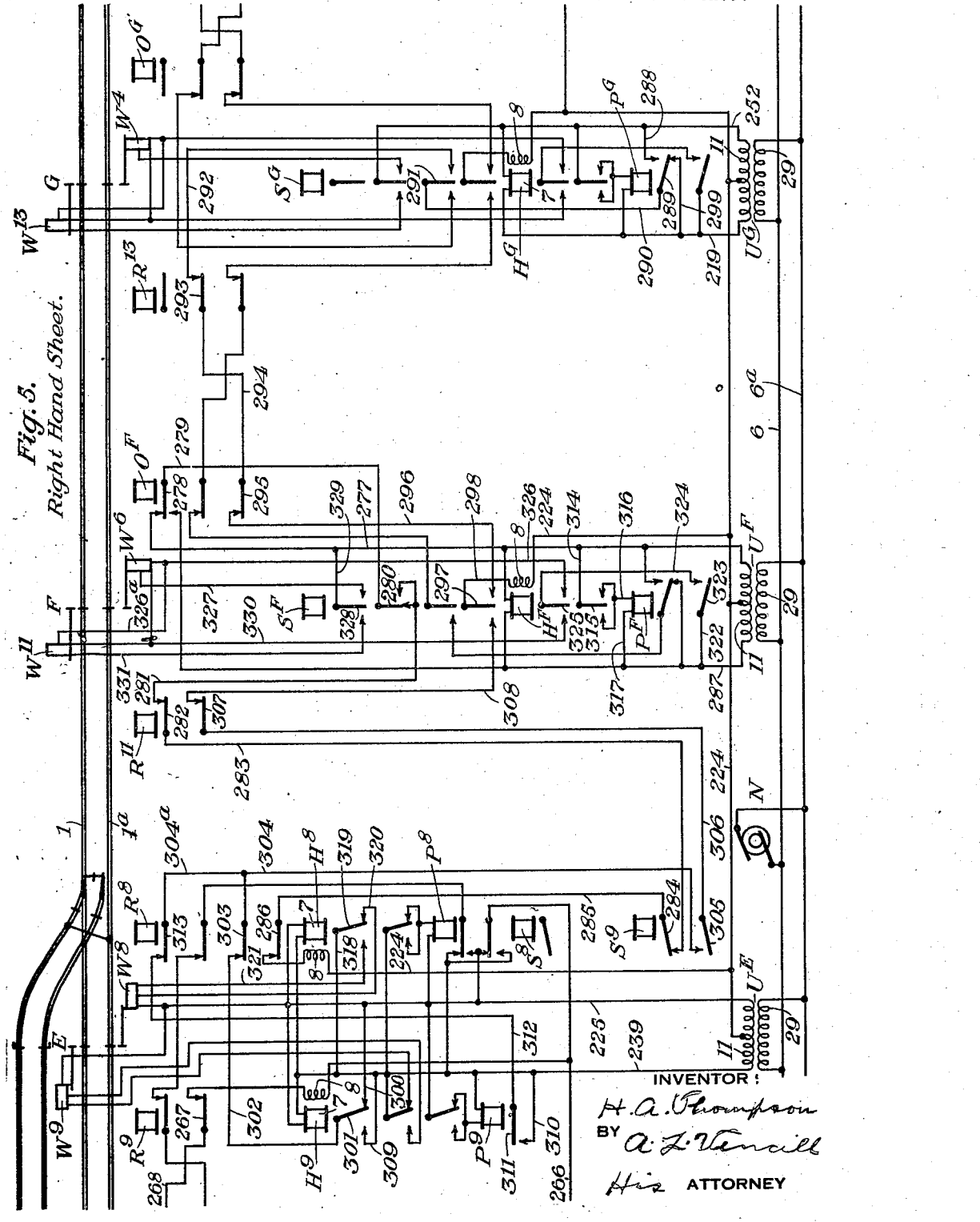

Patented Sept. 6, 1927.

1,641,789

UNITED STATES PATENT OFFICE.

HOWARD A. THOMPSON, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Application filed August 6, 1924. Serial No. 730,409.

My invention relates to railway traffic controlling apparatus.

I will describe two forms of apparatus embodying my invention, and will then point out the novel features thereof in claims.

In the accompanying drawings, Fig. 1 (two sheets) is a diagrammatic view showing a portion of one form of trackway apparatus embodying my invention. Figs. 2 and 3, each consisting of two sheets, are views showing other portions of the apparatus partially illustrated in Fig. 1, and also embodying my invention. Figs. 4 and 5 are diagrammatic views showing portions of a modification of the apparatus shown in Figs. 1, 2 and 3, and also embodying my invention.

Similar reference characters refer to similar parts in each of the several views.

Referring first to Fig. 1, the reference characters 1 and $1^a$ designate the track rails of a stretch of railway over which traffic normally moves in both directions. This stretch of track is provided with a passing siding X. The stretch of track shown in the drawings is a unit complete in itself, and any number of such units may be placed end to end to form a complete system consisting of stretches of single track provided with passing sidings. The track rails 1 and $1^a$ are divided, by means of insulated joints 2, into a plurality of successive sections A—B, B—C, C—D, etc.

Eastbound traffic, that is, traffic moving from left to right, is controlled by two trackway signals $W^{10}$ and $W^8$ located at points D and E, respectively. In similar manner westbound traffic, that is, traffic moving from right to left, is controlled by signals $W^9$ and $W^7$ located at points E and D, respectively. These signals may be of any suitable form and are here shown as three-position semaphore signals, each capable of displaying a stop, a caution, or a proceed indication.

Each track section is provided with two track transformers designated by the reference character T with suitable distinguishing exponents and having their secondary windings 3 connected across the rails adjacent the left hand end, and right hand end, respectively, of the associated section. An impedance 5 is interposed between the secondary 3 of each track transformer T and one rail 1 of the corresponding section in the customary manner. Each section is also provided with two track relays one located at each end of the section and designated by the reference character R with an exponent corresponding to the location. Associated with each track relay R is a line relay designated by the reference character H with a suitable exponent. Line relays $H^7$, $H^{10}$, $H^9$ and $H^8$ located adjacent the passing siding X are each provided with a repeater relay designated by the reference character P with an appropriate distinguishing exponent. A stick relay designated by the reference character S with an appropriate exponent is located adjacent each line relay and is controlled, as will be described hereinafter, by the associated line relay and track relay. Located at point D are also two repeater relays $K^{12}$ and $K^9$ controlled in part by stick relays $S^{12}$ and $S^9$, respectively. A similar repeater relay $K^{11}$, controlled by stick relay $S^{11}$, is located at point E.

Referring now to Fig. 2, each signal W is controlled by the associated line relay H. The line relays for controlling these signals are each of the three-position type and each comprises two windings 7 and 8. Referring particularly to relay $H^8$ associated with signal $W^8$, one winding 8 of this relay is constantly connected with the terminals $a$ and $b$ of a suitable source of alternating current not shown in the drawing. It will thus be plain that contact members 9 and 10 of this relay are responsive to the relative polarity of the alternating current supplied to winding 7 of relay $H^8$. Each of the signals W is provided with a proceed circuit and a caution circuit. When winding 7 of relay $H^8$ is supplied with alternating current of one relative polarity, which I shall term "normal" relative polarity, contact members 9 and 10 are swung to the left and a circuit is closed from secondary winding 11 of transformer $U^E$, through wires 12, 13 and 14, normal contact 10 of line relay $H^8$, wire 15, winding of repeater relay $P^8$, and wires 16, 17 and 18, back to secondary 11 of transformer $U^E$. The primary 29 of transformer $U^E$ is constantly supplied with alternating current from some suitable source, such as a generator N over line wires 6 and 6ª. When this circuit is closed, therefore, relay P⁸ is energized and closes its front contacts. As a result a circuit is closed over which current flows from secondary 19 of transformer 20, through wires 21 and 22, front contact 23 of relay P⁸, wire 24, normal contact 9 of line relay H⁸, wire 25, operating mechanism of signal W⁸, and wires 26 and 27, back to secondary 19 of transformer 20. The primary 28 of transformer 20 is constantly connected with secondary 11 of transformer U^E. When the circuit just traced is closed signal W⁸ displays a proceed indication. When relay H⁸ is energized in the reverse direction repeater relay P⁸ is energized as before except that the circuit for this relay now passes from wire 14, through reverse point of contact 10 of relay H⁸ to wire 15 instead of through normal point of contact 10. The caution circuit for signal W⁸ is now closed and current flows from secondary 19 of transformer 20, through wires 21 and 22, front contact 23 of repeater relay P⁸, wire 24, reverse contact 9 of line relay H⁸, wire 30, operating mechanism of signal W⁸ and wires 26 and 27, back to secondary 19 of transformer 20, and the signal therefore displays a caution indication. If the supply of energy to either winding 7 or 8 of relay H⁸ is interrupted, contact members 9 and 10 assume intermediate positions, thus breaking both the caution and proceed circuits of signal W⁸ at contact 9, and also causing the de-energization of relay P⁸ and therefore breaking the circuits for signal W⁸ at front contact 23 thereon. Under these conditions signal W⁸ displays a stop indication. The control of each of the remaining signals will be readily understood from the foregoing.

Winding 7 of relay H⁸ is at times supplied with alternating current by transformer 32, the primary 33 of which is constantly supplied with alternating current from a line transformer U^F similar to transformer U^E. One circuit passes from secondary 31 of transformer 32, through wire 34, front contact 36 of line relay H⁶, wires 37 and 38, front contact 39 of stick relay S⁶, wire 41, front contact 42 of track relay R³, wire 43, winding 7 of relay H⁸, wires 44, 17 and 44ª, front contact 45 of relay H⁶, and wire 46, back to secondary 31 of transformer 32. This circuit is closed only when relays H⁶, S⁶ and R⁸ are energized, under which conditions winding 7 of relay H⁸ is supplied with alternating current of normal relative polarity and relay H⁸ is therefore energized in the normal direction. Another circuit may be traced from secondary 31 of transformer 32, through wires 34 and 47, back contact 45 of relay H⁶, wires 44ª, 17 and 44, winding 7 of relay H⁸, wire 43, front contact 42 of relay R⁸, wire 41, front contact 39 of relay S⁶, wires 38 and 37, back contact 36 of relay H⁶ and wire 46 back to secondary 31 of transformer 32. This circuit is closed only when relays R⁸ and S⁶ are energized and relay H⁶ is de-energized, under which conditions relay H⁸ is energized in the reverse direction. Each of the circuits just traced is provided with a branch passing from wire 37, through wire 48, front contact 49 of an auxiliary relay M¹¹, back to wire 41. The circuit is closed through this branch only when relay M¹¹ is energized, under which conditions relay S⁶ is removed from the control of relay H⁸. The control of relay H⁷ will be readily understood from the foregoing. Winding 7 of relay H⁹ is provided with a circuit which passes from secondary 50 of transformer 51 (the primary 52 of which is constantly supplied with alternating current from secondary 11 of transformer U^D) through wire 53, front contact 54 of relay P⁷, wire 55, front contact 56 of relay R⁷, wire 57, front contact 58 of relay R¹⁰, wire 59, front contact 60 of relay R⁹, wire 61, winding 7 of relay H⁹, wires 62 and 63, front contact 64 of relay P⁷ and wire 65 back to secondary 50 of transformer 51. This circuit is closed only when relays P⁷, R⁷, R¹⁰ and R⁹ are energized, under which conditions relay H⁹ is energized in the normal direction. When relays R⁹, R¹⁰ and R⁷ are all energized but relay P⁷ is de-energized, the circuit for winding 7 of relay H⁹ is the same as that just traced except that the contacts 54 and 64 of relay P⁷ are reversed thus reversing the relative polarity of the current supplied to relay H⁹ and hence relay H⁹ is energized in the reverse direction. The control of relay H¹⁰ is similar to the control of relay H⁹.

Relays H¹¹ and H¹² are single element relays and are each controlled solely by the associated track relays. For example the circuit for relay H¹¹ passes from secondary 11 of transformer U^F, through wire 66, front contact 67 of relay R¹¹, wire 68, winding of relay H¹¹, and wires 69, 70 and 71 back to secondary 11 of transformer U^F. This circuit is closed, and hence relay H¹¹ is energized, only when relay R¹¹ is energized.

Each of the remaining line relays H is controlled by the corresponding line relay of an adjacent section and by the stick relays associated with such corresponding line relay. For example, relay H⁶ is provided with a circuit which passes from secondary 11 of transformer U^G, through wire 72, front contact 75 of relay H⁴, wire 76, front contact 77 of track relay R⁶, wire 78, winding of relay H⁶, and wires 69, 70 and 79, back to secondary 11 of transformer U^G. This circuit is closed, and relay H⁶ is energized, only when relays H⁴ and R⁶ are energized. This circuit is, however, provided with a branch which passes from wire 72, through wire 73, front contact 80 of relay S⁴, and wire 80ᵃ to wire 76. It will thus be clear that when relay S⁴ is energized relay H⁴ is removed from the control of relay H⁶.

Referring again to Fig. 1, relay S⁸ is provided with a pickup circuit and a stick circuit. The pickup circuit for this relay passes from terminal $a$ of a suitable source of energy not shown in the drawing, through back contact 81 of track relay R⁸, wires 82 and 83, front contact 84 of repeater relay P⁸, wires 85 and 86, winding of relay S⁸ and back to terminal $b$ of the energy source. The stick circuit for this relay passes from the terminal $a$ through back contact 81 of track relay R⁸, wire 82, back contact 87 of relay S⁹, wire 88, front contact 89 of relay S⁸, and wires 85 and 86, through the winding of relay S⁸ to terminal $b$. Stick relays S⁷, S¹⁰ and S⁹ are each controlled over circuits similar to those just traced for relay S⁸. Stick relay S¹¹ is provided with a pickup circuit which passes from terminal $a$, through front contact 90 of relay S¹³, through wire 91, back contact 92 of relay S⁶, wire 93, winding of relay S¹¹ to terminal $b$. The stick circuit for this relay passes from terminal $a$ through back contact 94 of track relay R¹¹, through wire 95, back contact 96 of relay S⁶, wires 97 and 131, front contact 98 of relay S¹¹, and wires 99 and 93, through the winding of relay S¹¹ to negative terminal $b$. The pickup circuit for relay S¹¹ is therefore closed only when relay S¹³ is energized and relay S⁶ is de-energized, thus energizing relay S¹¹. The closing of front contact 98 of relay S¹¹ when relays S⁶ and R¹¹ are both de-energized, however, closes the stick circuit for relay S¹¹.

The control of each remaining stick relay S is similar to the control of relay S¹¹.

Repeater relay K¹¹ is controlled by stick relay S¹¹ over a circuit which passes from terminal $a$ through front contact 100 of relay S¹¹, wire 101, back contact 102 of relay S⁸, wire 103, winding of relay K¹¹ and back to terminal $b$. Relay K¹¹ is therefore energized only when stick relay S¹¹ is energized and relay S⁸ is de-energized. The control of repeater relay K¹² by stick relay S¹² is similar to the control of relay K¹¹ by stick relay S¹¹.

Repeater relay K⁹ is provided with a circuit which passes from terminal $a$, through front contact 104 of relay S⁹, wire 105, back contact 106 of relay R⁹, wire 107, back contact 108 of relay R¹⁰, wire 109, winding of relay K⁹ and back to terminal $b$.

Directional relay M¹² located at point C is provided with a circuit which passes from terminal $a$, through front contact 204 of an auxiliary relay L⁶ located at point F, wire 219, front contact 119 of relay S¹¹, wire 118, front contact 117 of relay K¹¹, wire 220, back contact 114 of relay K¹², wire 113, back contact 112 of relay S¹², wire 221, winding of relay M¹² and back to terminal $b$. This circuit is closed, and hence relay M¹² is energized, only when relays L⁶, S¹¹ and K¹¹ are energized and relays K¹² and S¹² are de-energized. An auxiliary circuit is provided for relay M¹² in which current flows from terminal $a$, through front contact 208 of relay S⁹ and wire 222 to wire 220, and thence as before through relay M¹² to terminal $b$. It therefore follows that the energization of relay S¹⁰ removes relays L⁶, S¹¹ and K¹¹ from the control of relay M¹². The control of directional relay M¹¹ at point F will be readily understood from the foregoing.

The auxiliary stick relay L⁶ located at point F is provided with a pickup circuit over which current flows from terminal $a$, through back contact 123 of relay H⁶, wire 124, back contact 125 of relay R⁶, wire 126, back contact 127 of relay R¹¹, wire 128, front contact 129 of relay H¹¹, wire 130, winding of relay L⁶ and back to terminal $b$. This circuit is closed, and hence relay L⁶ is energized, only when relays H⁶, R⁶ and R¹¹ are de-energized and relay H¹¹ is energized. When relay L⁶ is energized a stick circuit is closed passing from terminal $a$ through back contact 94 of track relay R¹¹, wire 95, back contact 96 of relay S⁶, wires 97 and 131, front contact 133 of relay L⁶, wires 134 and 130, winding of relay L⁶ and back to terminal $b$. This stick circuit is effective to retain relay L⁶ in its energized position only when relays S⁶ and R¹¹ are both de-energized and relay L⁶ is already energized. The control of auxiliary stick relay L⁵ located at point C is the same as the control of relay L⁶.

Auxiliary relay Q¹³ located at point G is provided with a circuit over which current flows from terminal $a$, through front contact 135 of relays S⁶, wires 136, 137 and 137ᵃ, back contact 138 of relay S¹³, wire 139, winding of relay Q¹³ and back to terminal $b$. This circuit is closed only when relay S¹³ is de-energized and relay S⁶ is energized. When relay M¹¹ is energized however, terminal $a$ is connected directly to wire 137 over front contact 140 of relay M¹¹, thereby removing relay S⁶ from the control of relay Q¹³. Auxiliary relay Q¹⁴ located at point B is controlled in the same manner as relay Q¹³.

Track relay R⁹ is constantly connected across the rails adjacent the right hand end of section D—E. An impedance 141 is interposed between one rail 1 and the relay R⁹ for the purpose of protecting the relay from excessive currents when the adjacent track transformer T⁹ is energized. Under certain conditions however, namely, when stick relay S⁹ is energized, a low resistance path is completed around impedance 141, whereby the track relay R⁹ is connected directly to the rails of section D—E. This low resistance path may be traced from the left hand terminal of impedance 141, through wire 142, front contact 143 of relay S$^9$ and wire 144, back to the right hand terminal of impedance 141. Track relay R$^{10}$ is provided with a circuit which passes from rail 1 of section D—E, through wire 145, back contact 146 of repeater relay K$^9$, wire 147, winding of relay R$^{10}$, and wire 148 back to rail 1$^a$ of section D—E. It will be plain that relay R$^{10}$ is connected to the rails of the associated section only when relay K$^9$ is de-energized. The control of relays R$^7$ and R$^8$ is similar to that of relay R$^{10}$ and will be understood without further explanation. Relay R$^5$ is normally connected with the rails adjacent the right hand end of section B—C, but is disconnected therefrom when relay S$^{12}$ is energized, the circuit for this relay passing from rail 1 of section B—C, through wire 215, back contact 216 of relay S$^{12}$, wire 217, winding of relay R$^5$, and wire 218 back to rail 1$^a$ of section B—C. Relay R$^6$ is provided with a circuit similar to that just traced for relay R$^5$.

The remaining track relays R are all normally disconnected from their associated sections but are arranged to be at times connected across the rails of such sections by the associated stick relay S. For example, the circuit for relay R$^{12}$ may be traced from rail 1 of section C—D, through wire 149, front contact 150 of stick relay S$^{12}$, wire 151, winding of relay R$^{12}$, and wire 152, to rail 1$^a$ of section C—D.

It will be apparent from the drawing that when relay S$^9$ is de-energized, the secondary 4 of track transformer T$^9$ is supplied with energy. The track transformer T$^{10}$ located at the other end of section D—E is, however, supplied with energy only when relay K$^9$ is energized. Relay K$^9$ is energized only when relay S$^9$ is energized, and therefore only one of the track transformers for section D—E is energized at a time. Furthermore, when track circuit current is being supplied to section D—E by transformer T$^9$, relay R$^{10}$ is connected across the rails of the section, and the low resistance path around impedance 141 is open. On the other hand, when transformer T$^{10}$ is supplying energy to section D—E, relay R$^{10}$ is disconnected from the section, and impedance 141 is short-circuited, thus connecting relay R$^9$ directly with the rails.

Transformer T$^{11}$ is energized over front contact 140 of relay M$^{11}$ or over front contact 135 of relay S$^6$, so that section E—F is supplied with track circuit current from transformer T$^{11}$ when either relay M$^{11}$ or S$^6$ is energized. The supply of energy to primary 4 of track transformer T$^8$ is controlled by front contact 153 of relay K$^{11}$ and hence this transformer is energized only when relay K$^{11}$ is picked up. The supply of track circuit current to section C—D is controlled in the same manner as just described in connection with section E—F.

Transformer T$^{13}$ located at the right hand end of section F—G is arranged to be energized only when relay S$^4$ or relay Q$^{13}$ is energized, and transformer T$^{14}$ is similarly controlled by relays S$^3$ and Q$^{14}$.

Each of the remaining track transformers is controlled by an adjacent stick relay S. For example the circuit for transformer T$^4$ passes from terminal $a$ through front contact 154 of stick relay S$^{13}$, wire 155, primary winding 4 of transformer T$^4$ and back to terminal $b$. It will be seen that the control of track transformers and track relays is such that for each section except section D—E, when a track transformer at one end of a section is energized, the adjacent track relay is disconnected from the rails but the track relay at the opposite end of the section is connected with the rails.

Means are also provided as shown in Fig. 3 for supplying to the rails of each section in parallel a current which I will term a "local" current. For this purpose each section is provided with an impedance $a$ connected across the rails adjacent the left hand end of the section, a similar impedance $c$ connected across the rails adjacent the right hand end of the section, and two other similar impedances $b$ and $d$ connected across the rails at intermediate points in the section. This local current is supplied by local transformers of which one is located at the junction of each two adjacent sections and designated by the reference character V with an exponent corresponding to the location. The primary winding of each transformer V is constantly supplied with alternating current from the line wires 6 and 6$^a$, shown in Fig. 2. For eastbound traffic section D—E is provided with a local circuit which passes from secondary 156 of transformer V$^E$, through wire 157, front contact 158 of repeater relay P$^8$, wires 159 and 160 to impedance $e$ in section D—E, thence through the rails of the section to impedance $a$, wire 161, front contact 162 of stick relay S$^{10}$, wire 163, back contact 164 of relay K$^9$, wire 165, back contact 166 of stick relay S$^9$, wire 167, front contact 168 of relay P$^8$, and wire 169 back to secondary 156 of transformer V$^E$. This circuit is closed only when relays P$^8$ and S$^{10}$ are energized and relays S$^9$ and K$^9$ are de-energized, under which conditions local current of normal relative polarity is supplied to the rails of the section D—E throughout their length. If relay P$^8$ is de-energized as by the de-energization of relay H$^8$ due to the presence of a train in section E—F, local current of reverse relative polarity is supplied to that portion of section D—E between impedances $a$ and $d$ over the following circuit: From secondary 156 of transformer $V^E$, through wire 157, back contact 158 of relay $P^8$, wire 170, back contact 166 of relay $S^5$, wire 169, back contact 164 of relay $K^9$, wire 163, front contact 162 of relay $S^{10}$, wire 161, impedance $a$ in section D—E, through the rails of the section to impedance $d$, wire 171, back contact 168 of relay $P^8$, and wire 157 back to secondary 156 of transformer $V^E$. It will be seen that section D—E is supplied with local current of normal relative polarity throughout its length, or with local current of reverse relative polarity through a portion of the section, according as relay $P^8$ is energized or de-energized, respectively. For governing westbound traffic section D—E is also provided with local circuits similar to those just described for governing eastbound traffic as will be clear from the drawing.

Westbound traffic through section E—F is controlled by local current supplied to the section over a circuit which passes from secondary 172 of transformer $V^E$ through wire 173, front contact 174 of relay $P^9$, wire 175, normal contact 202 of line relay $H^9$, wires 176 and 177, impedance $a$ in section E—F, through the rails of this section to impedance $e$, wire 178, front contact 179 of relay $S^{11}$, wire 180, front contact 181 of relay $K^{11}$, wire 182, back contact 183 of relay $S^8$, wires 184 and 185, normal contact 186 of relay $H^9$, wire 187, front contact 188 of relay $P^9$, and wire 189 back to secondary 172 of transformer $V^E$. Another local circuit may be traced from secondary 172 of transformer $V^E$, through wire 173, front contact 174 of relay $P^9$, wire 175, reverse contact 202 of relay $H^9$, wire 184, back contact 183 of relay $S^8$, wire 182, front contact 181 of relay $K^{11}$, wire 180, front contact 179 of relay $S^{11}$, wire 178, impedance $e$ in section E—F, through the rails of the section to impedance $a$, wires 177 and 190, reverse contact 186 of relay $H^9$, wire 187, front contact 188 of relay $P^9$, and wire 189, back to secondary 172 of transformer $V^E$. It follows that when relays $S^{11}$, $K^{11}$ and $P^9$ are energized and relay $S^8$ is de-energized, section E—F is supplied with local current of normal relative polarity or of reverse relative polarity throughout the length of the section, according as relay $H^9$ is energized in the normal or reverse direction. If relay $H^9$ is de-energized, as by the presence of a train in section D—E, relay $P^9$ is also de-energized and a local circuit is closed over which current flows from secondary 172 of transformer $V^E$, through wire 173, back contact 174 of relay $P^9$, wire 191, impedance $b$ in section E—F, through the rails of the section to impedance $e$, wire 178, front contact 179 of relay $S^{11}$, wire 180, front contact 181 of relay $K^{11}$, wire 182, back contact 183 of relay $S^8$, and wires 184 and 192, back contact 188 of relay $P^9$ and wire 189 back to secondary 172 of transformer $V^E$. When this circuit is closed local current of reverse relative polarity is supplied to the rails of section E—F between impedances $b$ and $e$.

Eastbound traffic through section E—F is controlled by local current supplied by transformer $V^F$. One local circuit may be traced from secondary 156 of transformer $V^F$, through wire 193, front contact 194 of line relay $H^6$, wires 195 and 178, impedance $e$ in section E—F, through the rails of the section to impedance $a$, wire 177, back contact 181 of relay $K^{11}$, wire 180, back contact 179 of relay $S^{11}$, wire 196, front contact 197 of relay $S^6$, wire 198, front contact 199 of relay $H^6$ and wire 200, back to secondary 156 of transformer $V^F$. This circuit is closed only when relays $H^6$ and $S^6$ are energized and relays $S^{11}$ and $K^{11}$ are de-energized, under which conditions section E—F is supplied with local current of normal relative polarity throughout its length. If, however, relay $H^6$ is de-energized, as by the presence of a train in section F—G, a local circuit is closed over which current flows from secondary 156 of transformer $V^F$, through wire 193, back contact 194 of relay $H^6$, wire 198, front contact 197 of relay $S^6$, wire 196, back contact 179 of relay $S^{11}$, wire 180, back contact 181 of relay $K^{11}$, wire 177, impedance $a$ in section E—F, through the rails of the section to impedance $d$, wire 201, back contact 199 of relay $H^6$ and wire 200 back to secondary 156 of transformer $V^F$. When this circuit is closed local current of reverse relative polarity is supplied to the rails of section E—F between impedances $a$ and $d$. The local circuits for section C—D are exactly the same as for section E—F and will be readily understood without further explanation.

Eastbound and westbound traffic through each of the remaining sections is controlled by local circuits similar to the local circuits for controlling eastbound traffic through section E—F.

Before explaining the operation of the apparatus as a whole it should be pointed out that the trackway apparatus herein shown and described is suitable for co-operation with train carried governing means in the following manner: When a train occupies a portion of track which is being supplied with track circuit current and with local current of normal relative polarity a proceed indication is received on board the train; when the stretch of track occupied by a train is supplied with track circuit current and with local current of reverse relative polarity, a caution indication is received on the train; but when the supply of either track circuit current or local current to the portion of track occupied by the train is for any reason interrupted, the train receives a stop indication.

In at least one form of train carried apparatus arranged to function in this manner the indications are transferred to the train through the medium of suitable "pickup" apparatus, the portion of the apparatus which picks up the track circuit current being located in advance of the forward axle of the train. It is obvious that with apparatus constructed in this manner the supply of track circuit current must always be connected across the rails in advance of the train, otherwise the track circuit current will be shunted away from the pickup apparatus and the train will always receive a stop indication.

The trackway apparatus shown in the drawings is arranged to permit movements of traffic in both directions, the route being set up in one direction or the other through the single track stretches intervening the passing sidings by suitable control of the stick relays associated with such single track stretches. For example, to prepare the stretch of track to the right of passing siding X for westbound traffic moves, relays $S^{15}$, $S^4$, $S^2$, etc. are energized. Since the pickup ner to permit eastbound traffic moves through this stretch of track, stick relays $S^6$, $S^4$, $S^2$, etc, are energized. Since the pickup circuit for each stick relay S is carried over a back contact of the opposing stick relay at the same location it is impossible for the route to be set up for conflicting movements. Furthermore, the stick relays in each series are progressively energized, that is, when relay $S^6$ is energized, the closing of the front contact 92 thereon completes the pickup circuit for relay $S^4$. The closing of relay $S^4$ in turn picks up relay $S^2$ and so on, as far as the next passing siding.

As shown in the drawings all parts of the apparatus are in the positions corresponding to an unoccupied condition of the track. Under these conditions all of the track transformers except transformer $T^9$ are de-energized. Current is supplied to transformer $T^9$ over back contact 104 of stick relay $S^9$, which is de-energized. Repeater relay $K^9$ is also de-energized and track relays $R^{10}$ and $R^9$ are both connected with the rails of section D—E and both are energized. All line relays H and all the remaining track relays R, all stick relays S, and all repeater relays and auxiliary relays are de-energized. Signals W at passing siding X are all at stop.

In explaining the operation of the apparatus, I will assume that stick relay $S^{15}$, and consequently stick relays $S^{13}$ and $S^{11}$, are energized due to a westbound train approaching point J. These relays will remain in their energized condition, each being held closed by its pickup circuit over a front contact of the corresponding relay for the adjacent section on the right. The closing of stick relay $S^{15}$ connects relay $R^{15}$ with the rails of section G—J and energizes transformer $T^2$. The closing of relay $S^{13}$ energizes track transformer $T^4$ and connects relay $R^{13}$ with the rails of section F—G, and the closing of relay $S^{11}$ energizes transformer $T^6$ and connects relay $R^{11}$ with the rails of section E—F. The closing of front contact 100 of relay $S^{11}$ also energizes relay $K^{11}$ which then connects primary 4 of track transformer $T^8$ with a source of energy. Relays $R^{11}$, $R^{13}$ and $R^{15}$ are therefore all energized. Relays $H^{11}$, $H^{13}$ and $H^{15}$ are also energized. Each section E—F, F—G and G—J is therefore supplied with track circuit current from a source located at the left hand end of the section, and sections F—G and G—J are also supplied with local current of normal relative polarity. If, now, the westbound train enters section G—J, relay $R^{15}$ is de-energized, thus de-energizing relay $H^{15}$. As a result the stick circuit for relay $S^{15}$ is now closed over back contact 203 of track relay $R^{15}$ and stick relay $S^{15}$ therefore remains in its energized condition. The train receives a proceed indication throughout the section. The operation of the apparatus as the train passes through section F—G will be readily understood. As the train moves out of section G—J, however, track relay $R^{15}$ picks up, thus breaking the stick circuit for relay $S^{15}$. The pickup circuit for this relay was broken by the de-energization of the stick relay (not shown) for the section next to the right and hence relay $S^{15}$ becomes de-energized, thereby disconnecting transformer $T^2$ from its energy source and track relay $R^{15}$ from the rails. As the train enters section E—F, the de-energization of relay $R^{11}$ closes, at back contact 127, the pickup circuit for relay $L^6$. This circuit is only closed for a brief interval before it is again opened at front contact 129 of relay $H^{11}$. Before this circuit is broken however, front contact 133 of relay $L^6$ closes and completes the stick circuit for this relay. Relay $L^6$ therefore remains in its energized condition until the train clears section E—F. The closing of front contact 204 of relay $L^6$ completes the circuit for relay $M^{12}$ located at point C and this relay therefore picks up. The closing of front contact 205 of relay $M^{12}$ in turn energizes transformer $T^{12}$ and relay $Q^{14}$, and relay $Q^{14}$ closes the primary circuit for transformer $T^{14}$. Relays $R^5$ and $R^7$ therefore becomes energized. At the same time the closing of contact 206 of relay $Q^{14}$ energizes line relay $H^5$. The closing of the front contacts of this line relay $H^5$ causes line relay $H^7$ to be energized in the normal direction over a front contact on relay $M^{12}$ and a front contact on relay $R^7$. The closing of the normal contacts on relay $H^7$ energizes repeater relay $P^7$. Signal $W^7$ therefore indicates proceed and local current of normal relative polarity is supplied to the rails of section D—E throughout their length.

Under these conditions transformer $T^9$ is energized over a back contact of relay $S^9$, and relays $R^9$ and $R^{10}$ are both connected with the rails of the section and are both energized. The energization of relays $P^7$ and $H^7$ therefore causes relay $H^9$ to be energized in the normal direction. Relay $P^9$ is therefore energized, signal $W^9$ moves to proceed position, and local current of normal relative polarity is supplied to the rails of section E—F throughout their length.

As the train enters section D—E relays $R^9$ and $R^{10}$ are de-energized. The de-energization of relay $R^9$ causes the de-energization of relay $H^9$ and hence of relay $P^9$, and so allows signal $W^9$ to display the stop indication. Before relay $P^9$ becomes de-energized, however, the pickup circuit for relay $S^9$ is closed and this relay $S^9$ subsequently remains closed due to its stick circuit including a back contact on relay $R^9$. The energization of relay $S^9$ completes the circuit for relay $K^9$ over back contact 106 of relay $R^9$ and back contact 108 of relay $R^{10}$. When relay $K^9$ picks up relay, $R^{10}$ is disconnected from section D—E, and transformer $T^{10}$ is energized, and track circuit current is therefore supplied to section D—E from a point in advance of the train. The train therefore receives a proceed indication as it moves through section D—E.

As the train successively clears sections F—G and E—F, the apparatus associated with these sections functions as explained in connection with section G—J, relay $K^{11}$ at point E becoming de-energized when relay $S^{11}$ becomes de-energized.

As the train enters section C—D, the de-energization of track relay $R^7$ completes the pickup circuit for relay $S^7$. This circuit passes over a front contact of relay $P^7$ which becomes de-energized due to the de-energization of relay $H^7$, but the stick circuit for relay $S^7$ is closed over its own front contact and the stick relay therefore remains in its energized condition as long as the train occupies section C—D. The de-energization of relay $H^7$ also causes signal $W^7$ to indicate stop. The closing of front contact 207 on stick relay $S^7$ picks up relay $S^5$, which in turn picks up $S^3$, thus picking up progressively each of the relays in this series as far as the next passing siding. It should also be pointed out that as the train moves out of section E—F, thereby causing the de-energization of relay $K^{11}$, the original pickup circuit for relay $M^{12}$ is opened but this relay is energized, as long as the train occupies section D—E, over a circuit including front contact 208 of stick relay $S^9$. When the train clears section E—F, relay $M^{12}$ becomes de-energized, thus opening one circuit for transformer $T^{12}$ and relay $Q^{14}$ at contact 205 thereon, but energy is supplied to these devices over front contact 209 of relay $S^5$, which relay is now energized.

When the train clears section D—E, relay $R^9$ becomes energized, thus de-energizing relay $S^9$, and in turn, relay $K^9$. The de-energization of relay $S^9$ energizes transformer $T^9$ and opens the shunt around relay $R^9$, and the de-energization of relay $K^9$ de-energizes transformer $T^{10}$ and connects relay $R^{10}$ with the track. Relays $R^9$ and $R^{10}$ are therefore both energized. The train occupying section C—D, however, de-energizes relay $H^9$ and signal $W^9$ still displays a stop indication.

The operation of the apparatus as the train proceeds through sections B—C and A—B will be readily understood from the description of the operation of the apparatus for section G—J. Attention should however, be called to the fact that when the train clears section B—C, relay $S^5$ becomes de-energized thus de-energizing relay $Q^{14}$, but under these conditions transformer $T^{14}$ is energized over front contact 210 of relay $S^3$.

The operation of the apparatus for traffic from left to right is similar to that just explained for westbound movements except that when the train enters section D—E, the track transformer located at the forward end of the section, that is, transformer $T^9$ is already energized and hence no change occurs in the connections of the track relays and track transformers as the train traverses this section.

It will be seen from the foregoing that if a train is proceeding along the stretch of track shown in the drawing, and the supply of power to the trackway apparatus is for any reason interrupted, the train will continuously receive a stop indication irrespective of traffic conditions when the power supply is resumed. To enable the engineman to receive proper indications, certain manually operable circuit controllers are located at intervals along the roadside for energizing the stick relay next in advance. For example, I will assume that westbound train is in section F—G and the power fails. When the power is resumed, however, stick relay $S^{11}$ will not become energized, but by closing circuit controller 211 at point F, relay $S^{11}$ picks up, thus energizing relay $K^{11}$ and restoring the apparatus to normal. Similar circuit controllers 212 for movements from left to right are also located at intervals along the trackway.

In connection with the local circuits, I will assume that a westbound train moves into section F—G and stops. Relay $H^{13}$ is therefore de-energized, and section G—J is supplied with local current of reverse relative polarity between impedances $b$ and $e$ and with no local current between impedances $a$ and $b$. The section is also supplied with track circuit current from transformer $T^4$. If, now, a following train enters the stretch of track to the right of siding X, it will receive a proceed indication as far as point J, a caution indication between point J and impedance $b$ in section G—J, and a stop indication, due to the absence of local current, if the train proceeds past impedance $b$. If the train enters section F—G, it will continue to receive a stop indication since the track circuit current in this section is shunted by the first train already occupying this section.

The protection of following trains proceeding through the other sections will be readily understood from the drawings, the circuits varying only in details for different sections.

I will next assume that an eastbound train is approaching the passing siding X as in section A—B. Relays $S^5$ and $M^{12}$ will therefore both be de-energized and relay $S^{12}$ will be energized. If, now, a westbound train approaches passing siding X such westbound train will receive a proceed indication as far as point F. As the train passes point F, thus energizing relay $L^6$, relay $M^{12}$ will not pick up, its circuit being open at contact 112 of relay $S^{12}$. Relay $H^7$ therefore does not pick up, and as a result relay $H^9$ is energized in the reverse direction, thus moving signal $W^9$ to the caution position, and supplying section E—F with local current of reverse relative polarity. Similarly, relay $P^7$ being de-energized, section D—E is supplied with local current of reverse relative polarity between impedances $b$ and $c$, but with no local current between impedances $a$ and $b$. The westbound train will therefore receive a caution indication between point F and impedance $b$ in section D—E, and will receive a stop indication if the train proceeds past such impedance $b$.

Operation of the apparatus for eastbound traffic is the same as that just described for westbound traffic.

It should be particularly pointed out that all track circuits except the track circuit located at passing sidings are normally de-energized, are energized only when a train approaches, and are again de-energized as soon as the train clears the first track circuit in advance. The signals are also normally at danger and display less restrictive indications only when a train approaches the signal in the direction in which the signal governs, and then only when traffic conditions are safe.

Referring now to Figs. 4 and 5, I have here shown a modification of my invention applied to a stretch of single track provided with a passing siding X similar to that shown in Figs. 1, 2 and 3. Sections C—D, D—E, E—F and F—G are shown complete in these figures, it being understood that additional sections of single track between passing sidings would be provided, at the junction of each two adjacent sections, with apparatus similar to that illustrated at location G. The primary of each track transformer is constantly supplied with alternating current from secondary 11 of the associated line transformer U, the primary 29 of each line transformer U being supplied as before with alternating current from generator N.

Having reference particularly to Fig. 4, it will be seen that each track section is provided with a track circuit comprising the secondary 3 of a track transformer T and a track relay R. For each section except section C—D the transformer is connected across the left hand end of the section and the relay across the right hand end of the section. In section C—D, however, the relay $R^{12}$ is connected across the left hand end of the section and transformer $T^7$ is connected across the right hand end of the section. Sections C—D, D—E and E—F are each further provided with a second track relay connected across the rails adjacent the associated track transformer and are designated R with suitable distinguishing exponents.

Located at point F is a repeater relay $O^F$ arranged to be energized when relay $R^{13}$ is energized. The circuit for relay $O^F$ may be traced from the left hand terminal of secondary 11 of transformer $U^G$, through wires 219 and 220, front contact 221 of relay $R^{13}$, wire 222, winding of relay $O^F$, and wire 224, back to the mid-point of secondary 11 of transformer $U^G$. A repeater relay $O^G$ located at point G is similarly controlled by a track relay (not shown) for the section to the right of point G. Two line relays $H^7$ and $H^{10}$ are located adjacent point D and two similar relays $H^9$ and $H^8$ are located adjacent point E. A similar line relay designated by the reference character H with a suitable distinguishing exponent is located at each of the points F, G and C. Each line relay H comprises two windings 7 and 8 and is similar to certain line relays H illustrated on Fig. 2. Associated with each line relay H is a repeater relay designated by the reference character P with the same exponent as the associated line relay.

Located at point E is a directional relay $S^8$ having a pick up circuit and stick circuit. When relays $P^9$, $R^9$, $R^8$ and $S^9$ are de-energized and relay $P^8$ is energized, a pick up circuit is closed for relay $R^8$ over which current flows from the right hand terminal of secondary 11 of transformer $U^E$, through wires 225 and 226, back contact 227 of relay P⁹, wire 228, back contact 229 of relay R⁹, wire 230, back contact 231 of relay R⁸, wire 232, front contact 233 of relay P⁸, wires 234 and 235, winding of relay S⁸, wire 236, back contact 237 of a second directional relay S⁹, and wires 238 and 239 back to secondary 11 of transformer U^E. The stick circuit for relay S⁸ may be traced from secondary 11 of transformer U^E, through wires 225 and 240, back contact 241 of relay P⁸, wire 242, front contact 243 of relay S⁸, wires 234ᵃ and 235, winding of relay S⁸, wire 236, back contact 237 of relay S⁹, and wires 238 and 239 back to secondary 11 of transformer U^E. This stick circuit serves to maintain relay S⁸ in its energized condition when once energized, as long as relays P⁸ and S⁹ are de-energized.

Located at point F is a directional relay S^F comprising two windings 7 and 8. Winding 7 is constantly supplied with alternating current from secondary 11 of the associated track transformer U^F. Winding 8 of relay S^F is controlled both by relay S⁸ and by a directional relay S^G located at point F and similar to relay S^F. One circuit for relay S^F passes from the right hand terminal of secondary 11 of transformer U^E, through wires 225 and 244, front contact 245 of relay S⁸, wires 246 and 247, back contact 248 of relay S^F, wires 249 and 250, winding 8 of relay S^F, and wires 251 and 224 back to the mid point of secondary 11 of transformer U^E. When this circuit is closed, relay S^F is supplied with alternating current of such polarity that the contact fingers operated thereby are swung to the right, which I shall hereinafter term the "normal direction." Under this condition the circuit just traced is opened but a branch is closed for this circuit over which current flows from wire 247, through the normal point of contact 332 of relay S^F, and wire 333 to wire 250. Relay S^F therefore continues to be energized in the normal direction as long as relay S^F is energized. When relay S^F is energized in the normal direction current is supplied to relay S^G from the right hand terminal of secondary 11 of transformer U^F, through wires 277 and 334, normal point of contact 335 of relay S^F, wire 336, back point of contact 248 of relay S^G, wires 249 and 250, winding 8 of relay S^G, and wires 251 and 224 back to the mid point of secondary 11 of transformer U^F. When this circuit is closed the relative polarity of the currents supplied to relay S^G is such that this relay is energized in the normal direction, and a stick circuit is then closed for relay S^G, over which current flows from the right hand terminal of secondary 11 of transformer U^G, through wires 252 and 253, back contact 254 of relay R¹³, wire 255, normal point of contact 248 of relay S^G, wires 249 and 250, winding 8 of relay S^G, and wires 251 and 224 back to the mid point of secondary 11 of transformer U^G. It is therefore apparent that relay S^G, having once been energized in the normal direction, will be maintained in this condition as long as relay R¹³ is de-energized.

Relay S^C is controlled by a directional relay located to the left of point C and not shown in the drawing in the same manner that relay S^G is controlled by relay S^F. Furthermore, a relay S⁷ located at point D is controlled over circuits similar to those of relay S⁸. When this relay is energized, relay S^C is energized in such direction that the contact fingers thereon are swung to the left, I shall hereinafter term this the "reversed" direction" of energization. When relay S^G is energized in the reverse direction relay S^F is also energized in the reverse direction, and a circuit is closed for relay S⁹ which may be traced from the left hand terminal of secondary 11 of transformer U^G, through wires 219 and 338, reverse point of contact 339 of relay S^G, wires 340, 247 and 246, back contact 245 of relay S⁸, wire 341, winding of relay S⁹, and wire 224 back to the mid point of secondary 11 of transformer U^G. In a similar manner relay S¹⁰ is arranged to be energized when relay S⁷ is de-energized and the first directional relay to the left of relay S^C is energized in the normal direction.

It will be plain from the foregoing that when relay S⁸ is energized the directional relays to the right of point E are successively energized in the normal direction as far as the relay located at the next passing siding to the right and corresponding to relay S¹⁰. Furthermore, when the relay located at the next passing siding to the right and corresponding to relay S⁷ is energized, the directional relays S associated with the track between such siding and siding X, (S^G, S^F, etc.) are energized in the reverse direction and relay S⁹ is also energized.

I will now describe the control of the line relays and repeater relays. Referring to Fig. 5, one winding 7, of each line relay H is constantly supplied with alternating current from secondary 11 of an adjacent line transformer U. Relay H⁹ is provided with a circuit over which current flows from the left hand terminal of secondary 11 of transformer U^D, through wires 262 and 263, front contact 264 of relay P⁷, wires 265 and 266, winding 8 of relay H⁹, front contact 267 of relay R⁹, wire 268, front contact 269 of relay R¹⁰, wire 270, front contact 271 of relay R⁷, wire 272, front contact 273 of relay P⁷ and wires 274 and 275 back to the right hand terminal of secondary 11 of transformer U^D. It will be observed that contacts 273 and 264 of relay P⁷ constitute a pole changer for controlling the relative polarity of the current supplied to winding 8 of relay H⁹. It will be plain that when relays $R^9$, $R^{10}$ and $R^7$ are energized, relay $H^9$ will be supplied with current of one relative polarity, which I will term "normal" relative polarity when relay $P^7$ is energized, and with current of the other relative polarity, which I will term "reverse" relative polarity, when relay $P^7$ is de-energized. Relay $H^{10}$ is controlled by relays $R^{10}$, $R^9$ and $R^8$ and $P^8$ in the same manner as just described for the control of relay $H^9$ by relays $P^7$, $R^7$, $R^{10}$ and $R^8$. Relay $H^8$ is provided with a circuit over which current flows from the right hand terminal of secondary 11 of transformer $U^F$, through wire 277, front contact 278 of relay $O^F$, wire 279, back point or normal point of contact 280 of relay $S^8$, wire 281, front contact 282 of relay $R^{11}$, wire 283, back contact 284 of relay $S^9$, wire 285, front contact 286 of relay $R^8$, winding 8 of relay $H^8$ and wire 224 back to the mid point of secondary 11 of transformer $U^F$. When this circuit is closed, current of normal relative polarity is supplied to relay $H^8$. If, however, relay $O^F$ is de-energized, wire 279 is then connected by back contact 278 of relay $O^F$ with wire 287 and the left hand terminal of secondary 11 of transformer $U^F$. The current then supplied to relay $H^8$ is of reverse relative polarity and it follows that contact 278 of relay $O^F$ constitutes a pole changer for reversing the relative polarity of the current supplied to relay $H^8$. The control of relay $H^7$ is similar to that just described for relay $H^8$ except that the relative polarity of the current supplied thereto is controlled by contact 350 of relay $R^5$ instead of a contact on a repeater relay O.

Relay $H^F$ is arranged to be controlled by apparatus located at point E or by apparatus located at point G depending on the direction of energization of the associated directional relay $S^F$. When relay $S^F$ is energized in the normal direction one circuit may be traced for relay $H^F$ over which current flows from the right hand terminal of secondary 11 of transformer $U^G$, through wires 252 and 288, front contact 289 of relay $P^G$, wire 290, normal point of contact 291 of relay $S^G$, wire 292, front contact 293 of relay $R^{13}$, wire 294, front contact 295 of relay $O^F$, wire 296, normal point of contact 297 of relay $S^F$, wire 298, winding 8 of relay $H^F$, and wire 224, back to the mid point of secondary 11 of transformer $U^G$. When this circuit is closed, relay $H^F$ is energized in the normal direction. If however, relay $P^G$ is de-energized, the closing of back contact 289 thereon connects wire 290 with the left hand terminal of secondary 11 by means of wires 299 and 219, thereby reversing the polarity of the currents supplied to relay $H^F$ and causing this relay to be energized in the reverse direction. When relay $S^F$ is energized in the reverse position, current is supplied to relay $H^F$ from the right hand terminal of secondary 11 of transformer $U^E$, through wires 225 and 300, normal point of contact 301 of relay $H^9$, wire 302, front contact 303 of relay $R^8$, wire 304, front contact 305 of relay $S^9$, wire 306, front contact 307 of relay $R^{11}$, wire 308, reverse point of contact 297 of relay $S^F$, wire 298, winding 8 of relay $H^F$, and wire 224, back to the mid point of winding 11 of transformer $U^E$. When this circuit is closed the alternating current supplied to relay $H^F$ is of normal relative polarity. Another circuit is provided for relay $H^F$, over which current flows from the left hand terminal of secondary 11 of transformer $U^E$, through wires 239 and 309, reverse contact 301 of relay $H^9$, thence as before through winding 8 of relay $H^F$ to the mid point of secondary 11 of transformer $U^E$. When this circuit is closed, relay $H^F$ is energized in the reverse direction. Still another circuit is provided for supplying current of reverse relative polarity to relay $H^F$. This circuit may be traced from the left hand terminal of secondary 11 of transformer $U^E$, through wires 239 and 310, back contact 311 of repeater relay $P^{11}$, wire 312, front contact 313 of relay $R^8$, wire 304ª, thence as before through winding 8 of relay $H^F$, and back to the mid point of secondary 11 of transformer $U^E$. The control of relays $H^G$ and $H^C$ will be obvious from the drawing without further explanation. Each repeater relay P is arranged to be energized only when the associated line relay H is energized. For example, the circuit for relay $P^F$ may be traced from the right hand terminal of secondary 11 of transformer $U^F$, through wires 277 and 314, normal or reverse point of contact 315 of relay $H^F$, wire 316, winding of relay $P^F$, and wires 317 and 286 back to the left hand terminal of secondary 11 of transformer $U^F$. The circuits for the remaining repeater relays P will be understood without detailed description.

Traffic through each section is controlled by a trackway signal. As here shown each signal is a three position semaphore signal designated by the reference character W with a distinguishing exponent, and is located adjacent the entrance end of the associated section for traffic in the direction in which the signal governs. It is understood however that this particular type and location of signal is not an essential part of my invention. Each signal W is controlled by an adjacent line relay H. For example, when relay $H^8$ is energized in the normal direction, current flows from the left hand terminal of secondary 11 of transformer $U^E$, through wires 239 and 318, normal point of contact 319 of relay $H^8$, wire 320, operating mechanism of signal $W^8$ and wire 225 back to secondary 11 of transformer $U^E$, and the signal $W^8$ then displays a proceed indication. When relay H⁸ is energized in the reverse direction, current flows from the left hand terminal of secondary 11 of transformer U^E, through wires 239 and 318, reverse point of contact 319 of relay H⁸, wire 321, operating mechanism of signal W⁸ and wire 225 back to transformer U^E. When this circuit is closed, signal W⁸ indicates caution. When relay H⁸ is de-energized both the caution operating circuit and the proceed operating circuit for signal W⁸ are broken and the signal displays a stop indication. Signals W⁷, W¹⁰ and W⁹ are each controlled by the associated line relay H in the same way as signal W⁸ is controlled by relay H⁸.

Relay H^F is arranged to control signal W¹¹ for westbound traffic or signal W⁶ for eastbound traffic depending upon the direction of energization of the associated directional relay S^F. For example, when relay S^F is energized in the reverse direction and relay H^F is energized in the normal direction, current flows from the left hand terminal of secondary 11 of transformer U^F, through wires 287 and 322, front contact 323 of relay P^F, wire 324, normal contact 325 of relay H^F, wires 326 and 326ª, operating mechanism of signal W¹¹, wire 331, left hand point of contact 328 of relay S^F and wires 329 and 277 back to secondary 11 of transformer U^F. Signal W¹¹ then displays a proceed indication. If relay H^F is energized in the reverse direction, however, the circuit passes from secondary 11 of transformer U^F as before to contact 325 of relay H^F, thence through the left hand point of this contact, through wire 330, operating mechanism of signal W¹¹, wire 331, left hand point of contact 328 of relay S^F, and thence as before back to transformer U^F, and the signal W¹¹ will then display a caution indication. When relay H^F is de-energized, both the circuits just traced for signal W¹¹ are interrupted and signal W¹¹ displays a stop indication. When relay S^F is energized in the normal direction, signal W⁶ is similarly controlled, as will be clear from the drawing, so that if relay H^F is energized in the normal direction, signal W⁶ will indicate proceed, if relay H^F is energized in the reverse direction, signal W⁶ will indicate caution, and if relay H^F is de-energized, signal W⁶ will indicate stop. It should also be pointed out that the de-energization of relay S^F will cause both the associated signals W¹¹ and W⁶ to indicate stop.

In explaining the operation of the apparatus I prefer to arrange the two halves of each sheet, (Figs. 4 and 5) with the right hand half of each sheet on the left. The drawings will then illustrate a complete stretch of single track intermediate two passing sidings. As shown in the drawing, then, the apparatus is all illustrated in the condition corresponding to the normal or unoccupied condition of the track. Under such conditions all track sections are supplied with track circuit current, all track relays R and repeater relays O are energized, and all directional relays S are de-energized. Relays H⁹, H⁸, H⁷ and H¹⁰ are energized in the normal direction, and repeater relays P⁹, P⁸, P⁷ and P¹⁰ are energized. The remaining line relays H and the associated repeater relays P are all de-energized. Signals W⁹, W⁸, W⁷ and W¹⁰, each indicate proceed, and the remaining signals indicate stop.

I will now assume that an eastbound train proceeds through the stretch of track shown in the drawing. As this train enters the section to the left of point E, relay R⁹ is de-energized. The opening of front contact 267 of relay R⁹ interrupts the circuit for line relay H⁹ which becomes de-energized, de-energizing in turn repeater relay P⁹, and causing signal W⁹ to indicate stop. As the train enters section E—F the de-energization of relay R⁸ causes relay H⁸ and relay P⁸ to become de-energized and causes signal W⁸ to indicate stop. During the interval subsequent to de-energization of track relay R⁸ and prior to the opening of front contact 233 of relay P⁸, a pick up circuit is closed for directional relay S⁸ which causes this relay to become energized. After relay P⁸ is de-energized, a stick circuit for relay S⁸ is closed over back contact 241 of relay P⁸, which serves to maintain relay S⁸ in the energized condition as long as any part of the train occupies section E—F. The closing of front contact 245 of relay S⁸ closes a pick up circuit for relay S^F which then becomes energized in the normal direction. The closing of normal point of contact 335 of relay S^F in turn picks up relay S^G in the normal direction and the closing of normal point of contact 335 of relay S^G picks up relay S^C in the normal direction. The closing of normal point of contact 335 of relay S^G also completes the circuit for relay S¹⁰ which then becomes energized. Front contact 356 of relay S¹⁰ is then closed. Since relays R⁷ and R¹² are energized, and since relay S^C is energized in the normal direction, and since relay H¹⁰ is energized in the normal direction; relay H^G is then supplied with current of such polarity that this relay is energized in the normal direction, thereby picking up relay P^C and causing signal W¹² to indicate proceed. The opening of back contact 359 of relay S¹⁰ breaks the circuit for relay H⁷ which in turn de-energizes relay P⁷ and causes signal W⁷ to indicate stop. Relay P^C being energized, relay H^G is supplied with current of normal relative polarity over front contact 357 thereon. Relay P^G is therefore energized and signal W⁴ indicates proceed. In similar manner the closing of relay $P^G$ causes relay $H^F$ to become energized in the normal direction thereby picking up relay $P^F$ and causing signal $W^6$ to indicate proceed. The train is therefore permitted to pass signal $W^6$. As the train enters section F—G, track relay $R^{13}$ and repeater relay $O^F$ both become de-energized, thus opening, at front contact 295 and front contact 293 of these two relays, the circuit for relay $H^F$ which then becomes de-energized and causes signal $W^6$ to display a stop indication. Relay $S^F$ is, however, maintained in its energized condition by current supplied over front contact 245 of directional relay $S^8$. As the rear of the train moves out of section E—F track relays $R^{11}$ and $R^8$ become energized thus completing the circuit for relay $H^8$ over normal point of contact 280 of relay $S^F$. Repeater relay $O^F$ is, however, de-energized and the relative polarity of the current supplied to relay $H^8$ is therefore reversed. Signal $W^8$ therefore indicates caution. The energization of relay $H^8$ in the reverse direction picks up relay $P^8$ thereby breaking the stick circuit for directional relay $S^8$ which relay becomes de-energized and by the opening of front contact 245 thereon de-energizes directional relay $S^F$. Under these conditions back point of contact 280 of relay $S^F$ is substituted for the normal point of this contact in the circuit for relay $H^8$. Normal contact 335 of directional relay $S^F$ is now open but relay $S^G$ is not de-energized, its stick circuit being closed over normal contact 248 of relay $S^G$ and back contact 254 of relay $R^{13}$, now de-energized. When the train enters section G—C relays $O^G$ and $R^5$ are de-energized, thus causing the de-energization of line relay $H^G$ and repeater relay $P^G$. Signal $W^4$ then indicates stop. As the train moves out of section F—G relays $O^F$ and $R^{13}$ become energized. The stick circuit for relay $S^G$ is therefore broken and this relay becomes de-energized. Relay $S^C$ is maintained in its energized condition however over its stick circuit as previously explained in connection with relay $S^G$. The energization of relay $O^F$ reverses the relative polarity of the currents supplied to relay $H^8$ and that relay then becomes energized in the normal direction, thus causing signal $W^8$ to indicate proceed. The energization of relays $O^F$ and $R^{13}$ does not however, close the circuit for relay $H^F$, because this circuit is now open at contact 297 of relay $S^F$, which is de-energized, as has been explained. Signal $W^6$ therefore remains at stop. When the train enters section C—D relays $R^{12}$ and $R^7$ are opened. Relays $H^C$ and $P^C$ then become de-energized as will be understood from the drawing, and signal $W^{12}$ indicates stop. When the rear of the train passes out of section G—C, relay $S^C$ becomes de-energized by the opening of its stick circuit over the back contact of relay $R^5$ and this relay then becomes de-energized. Relays $O^G$ and $R^5$ are now energized but relay $H^G$ remains de-energized because of the de-energization of relay $S^G$. Relay $P^G$ is of course de-energized. Signal $W^4$ therefore continues to indicate stop. When the train enters the section to the right of point D, relay $R^{10}$ opens and de-energizes successively relays $H^{10}$ and $P^{10}$. Signal $W^{10}$ then indicates stop. When the train moves out of section C—D, energization of relays $R^{12}$ and $R^7$ follows. Relay $S^C$ being, de-energized, however, relays $H^C$ and $P^C$ remain de-energized and signal $W^{12}$ remains at stop. As the train moves out of the section to the right of point D, the energization of relay $R^{10}$ restores the apparatus to normal.

The operation of the apparatus as an eastbound train progresses through the section will be understood from the foregoing. It should be pointed out that under these conditions relay $S^7$ is picked up when the train passes point D, relays $S^C$, $S^G$ and $S^F$ are successively energized in the reverse direction and signal $S^9$ is picked up. Relay $W^8$ thus displays a stop indication because of the de-energization of relay $H^8$ by the opening of back contact 284 of relay $S^9$. The energization of relay $S^9$ causes relays $H^F$, $H^G$ and $H^C$ to become energized in the normal direction as signals $W^5$, $W^{13}$ and $W^{11}$ thereupon indicate proceed. Signal $W^7$ indicated stop as the train passed point D and the signals $W^5$, $W^{13}$, $W^{11}$ and $W^9$ each moved to the stop position as the train passes such signal. Signal $W^7$ moves successively to the caution and proceed positions as the westbound train passes points C and G respectively but signals $W^5$, $W^{13}$ and $W^{11}$ each remain in the stop position after the train has passed.

I will now assume that an eastbound train occupies section G—C. As explained hereinbefore signal $W^8$ will then indicate proceed, signal $W^{12}$ will indicate proceed, and signals $W^7$, $W^5$, $W^{13}$, $W^{11}$, $W^6$ and $W^4$ will all indicate stop. I will further assume that a second eastbound train enters the stretch of track shown in the drawing. The operation of the apparatus associated with section D—F will be exactly the same as described hereinbefore and relays $S^F$ and $S^G$ will each be energized in the normal direction. Relay $H^G$ however, due to the de-energization of relays $O^G$ and $R^5$ will not become energized. Relays $O^F$ and $R^{13}$ are picked up however and relay $H^F$ will thus be energized in the reverse direction over back contact 289 of relay $P^G$ now de-energized. Signal $W^6$ will therefore indicate caution. It will therefore be plain that protection is afforded against following trains in accordance with the usual and well known principles of absolute permissive block signaling.

Assuming as before that an eastbound train occupies section G—C I will also assume that a westbound train attempts to enter the stretch of track shown in the drawing. Signal W⁷ is, of course at stop, but if this train enters section C—D, relay R⁷ will become de-energized but the pick up circuit for relay S⁷ will not be closed since relay P⁷ is already de-energized. The directional relays are therefore not affected and signals W¹¹, W¹³ and W⁵ remain at stop. Complete protection is therefore afforded against opposing trains, it being particularly observed that as a train progressively past a passing siding a route is set up for traffic in the proper direction depending upon the direction of travel of the train.

Manually operable circuit controllers 211 and 212 are located at intervals along the trackway, the purpose of which is to restore the apparatus in the event of a power failure, and the operation of these circuit controllers is analogous to the operation of the similarly designated members in the first described modification.

One feature of the modification illustrated in Figs. 4 and 5, is that a single directional relay and single line relay are used at each location in the single track stretch in place of the two directional relays and two line relays shown in the arrangement of apparatus illustrated in the first three figures.

Although I have herein shown and described only two forms and arrangements of apparatus embodying my invention, it is understood that various changes and modifications may be made therein within the scope of the appended claims without departing from the spirit and scope of my invention.

Having thus described my invention what I claim is:

1. Railway traffic controlling apparatus comprising a stretch of railway track, means for supplying track circuit current to said stretch, two track relays one for each end of said stretch but normally disconnected therefrom, and means effective when a train approaches said stretch to connect one relay or the other with the rails of said stretch according to the direction in which said train is moving.

2. Railway traffic controlling apparatus comprising a stretch of railway track, means for supplying track circuit current to said stretch, two track relays one for each end of said stretch but normally disconnected therefrom, and means effective when a train approaches said stretch to connect one relay or the other with the rails of said stretch according to the direction in which said train is moving, and traffic governing means controlled by said relays.

3. Railway traffic controlling apparatus comprising a stretch of railway track, two normally de-energized track transformers one connected with the rails at each end of said stretch, means effective when a train approaches said stretch for energizing one said transformer or the other according to the direction in which said train moves, and governing means responsive to current in said stretch.

4. Railway traffic controlling apparatus comprising a stretch of railway track, two normally de-energized track transformers one connected with the rails at each end of said stretch, means effective when a train approaches said stretch for energizing one said transformer or the other according to the direction in which said train is moving, a track relay for said stretch, and traffic governing means controlled by said relay.

5. Railway traffic controlling apparatus comprising a stretch of railway track, two normally de-energized track transformers one connected with each end of said stretch, two track relays one located adjacent each end of said stretch but normally disconnected therefrom, means effective when a train moving in one direction approaches said stretch for energizing the transformer at one end of said stretch and for connecting the relay at the opposite end of the stretch with the rails and effective when a train moving in the opposite direction approaches said stretch for energizing the other said transformer and for connecting the other said relay with the stretch, and traffic governing means controlled by said relays.

6. Railway traffic controlling apparatus comprising a stretch of railway track, two normally de-energized track transformers one connected with each end of said stretch, two track relays one located adjacent each end of said stretch but normally disconnected therefrom, means effective when a train moving in one direction approaches said stretch for energizing the transformer at one end of said stretch and for connecting the relay at the opposite end of the stretch with the rails and effective when a train moving in the opposite direction approaches said stretch for energizing the other said transformer and for connecting the other said relay with the stretch, trackway governing means controlled by said relays, and train carried governing means controlled by current in said stretch.

7. Railway traffic controlling apparatus comprising a stretch of railway track, two normally de-energized track transformers one connected with the rails at each end of said stretch, means effective when a train approaches said stretch for energizing one said transformer or the other according to the direction in which said train moves, and train carried governing means responsive to current in said stretch.

8. Railway traffic controlling apparatus comprising a stretch of single track over which traffic normally moves in both directions, two normally de-energized transformers one connected with each end of said stretch, means effective when a train approaches said stretch from either direction for energizing only the transformer connected with the end of the stretch most remote from the train, and governing means on such train responsive to current in the trackway.

9. Railway traffic controlling apparatus comprising a stretch of single track over which traffic normally moves in both directions, two normally de-energized transformers one connected with each end of said stretch, means effective when a train approaches said stretch from either direction for energizing only the transformer connected with the end of the stretch most remote from the train, means effective when a train approaches said stretch for supplying local current to said stretch, and governing means on the train controlled by track circuit current and local current in said stretch.

10. In combination, a stretch of single track divided into a plurality of track sections, two series of normally de-energized directional relays one relay of each series for each section, means for energizing one said series when a train moving in one direction enters said stretch, means for energizing the other series of relays when a train moving in the opposite direction enters said stretch, means controlled by the two directional relays for each section for supplying such section with track circuit current from one end or the other of the section depending upon which such directional relay is energized, and governing means responsive to such track circuit current.

11. In combination, a stretch of railway track, a signal for controlling traffic through said stretch and controlled by track circuit current in said stretch, and means effective when a train approaches said stretch in the direction in which the signal governs for supplying track circuit current to said stretch.

12. In combination, a stretch of single track divided into a plurality of track sections, two series of normally de-energized directional relays one relay of each series for each section, means for energizing one said series when a train moving in one direction enters said stretch, means for energizing the other series of relays when a train moving in the opposite direction enters said stretch, means controlled by the two directional relays for each section for supplying such section with track circuit current from one end or the other of the section depending upon which such directional relay is energized, two track relays for each section one located at each end of such section but normally disconnected therefrom and each arranged to be connected with the associated section when such section is being supplied with track circuit current from the other end of the section, and governing means controlled by said track relays.

13. In combination, a stretch of railway track, two sets of governing apparatus operating on train carried mechanism by induction from the track rails and normally in condition to impose a more restrictive indication upon traffic in the two directions respectively through said stretch, and means effective when a train enters said stretch and responsive to traffic conditions in advance of said stretch in the direction in which the train is moving for causing said apparatus to automatically impose a less restrictive indication for such direction.

14. In combination, a stretch of railway track comprising a plurality of successive sections, two series of contacts, one contact of each series for each section, means for each section operating on train carried mechanism by induction from the track rails and controlled by the associated contact of one series for governing traffic in one direction through the section, means for each section operating on train carried mechanism by induction from the track rails and controlled by the associated contact of the other series for governing traffic in the opposite direction through the section, and means effective when a train enters the stretch and responsive to traffic conditions in advance of said stretch in the direction in which the train is moving for operating the series of contacts which controls governing means for the direction in which the train is traveling.

15. In combination, a stretch of railway track, a source of track circuit current normally disconnected from said stretch, means effective when a train approaches said stretch for automatically supplying said stretch with current from said source, and traffic governing means responsive to track circuit current in said stretch.

16. In combination two successive sections of railway track, a source of track circuit current for each section normally disconnected therefrom, a track relay for each section responsive to track circuit current in the associated section, means effective when a train approaches said sections for automatically supplying track circuit current to each said section from the associated source, and means controlled by the track relays for both said sections for controlling traffic through the two sections.

17. In combination, two successive sections of railway track, a track relay for each section responsive to track circuit current in the associated section, means effective when a train approaches said sections for automatically supplying track circuit current to said two sections, and a signal controlled by the track relays for said two sections for governing traffic through the sections.

In testimony whereof I affix my signature.

HOWARD A. THOMPSON.